US011162673B2

(12) United States Patent
Saito (10) Patent No.: US 11,162,673 B2
(45) Date of Patent: Nov. 2, 2021

(54) ILLUMINATION DEVICE HAVING FUNCTION OF COOLING LIGHT EMITTING PART AND CONTROL METHOD THEREFOR

(71) Applicant: CANON KABUSHIKI KAISHA, Tokyo (JP)

(72) Inventor: Keiichiro Saito, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/798,679

(22) Filed: Feb. 24, 2020

(65) Prior Publication Data

US 2020/0278108 A1   Sep. 3, 2020

(30) Foreign Application Priority Data

Feb. 28, 2019 (JP) .............................. JP2019-036138

(51) Int. Cl.
| | | |
|---|---|---|
| H01J 7/24 | (2006.01) |
| F21V 29/67 | (2015.01) |
| G03B 7/22 | (2021.01) |
| F21V 29/503 | (2015.01) |
| G03B 17/55 | (2021.01) |

(52) U.S. Cl.
CPC .......... *F21V 29/677* (2015.01); *F21V 29/503* (2015.01); *G03B 7/22* (2013.01); *G03B 17/55* (2013.01)

(58) Field of Classification Search
CPC ..... F21V 29/677; F21V 29/503; G03B 17/55; G03B 15/05; G03B 21/16; H01L 2224/49171; H04N 9/3144; Y02B 20/40; F24F 2110/10; G03G 15/5045; G11C 7/04; F25B 21/02

See application file for complete search history.

(56) References Cited

U.S. PATENT DOCUMENTS

2017/0257541 A1* 9/2017 Saito ...................... G03B 15/05

FOREIGN PATENT DOCUMENTS

| JP | 2002-291148 A | 10/2002 |
| JP | 2015-079883 A | 4/2015 |

* cited by examiner

*Primary Examiner* — William J Carter
*Assistant Examiner* — Omar Rojas Cadima
(74) *Attorney, Agent, or Firm* — Cowan, Liebowitz & Latman, P.C.

(57) ABSTRACT

An illumination device capable of appropriately suppressing a temperature rise of a light emitting part, wherein the illumination device comprises a light emitting part configured to emit light for illumination, a cooling part configured to cool the light emitting part. The illumination device acquires a temperature at a first position, acquires a temperature at a second position that is less susceptible to a temperature change of the light emitting part than the first position, determines presence or absence of light emission of the light emitting part, and controls driving of the cooling part based on the acquired temperature at the first position, the acquired temperature at the second position and a determination result of the presence or absence of light emission.

15 Claims, 8 Drawing Sheets

| TEMPERATURE DIFFERENCE D | LIGHT EMISSION DETERMINATION | Duty |
|---|---|---|
| $D \geq \delta$ | – | 80% |
| $\gamma \leq D < \delta$ | – | 60% |
| $\beta \leq D < \gamma$ | PRESENCE | 40% |
| | ABSENCE | 0% |
| $D < \beta$ | – | |

$(\beta < \gamma < \delta)$

ILLUMINATION DEVICE HAVING FUNCTION OF COOLING LIGHT EMITTING PART AND CONTROL METHOD THEREFOR

BACKGROUND OF THE INVENTION

Field of the Invention

The present invention relates to an illumination device having a function of cooling a light emitting part and a control method therefor.

Description of the Related Art

Conventionally, in order to protect a product, illumination devices have a function of limiting a temperature of a light emitting part that rises due to continuous light emission, within a safe range. However, it is difficult to distinguish whether the temperature of the light emitting part rises due to heat generated by light emission or rises due to an environmental temperature rise in an illumination device that limits light emission in accordance with a temperature of a light emitting part measured by a thermometer. In particular, in an illumination device having a cooling mechanism such as a fan, it is difficult to appropriately control a cooling mechanism suitable for a cause of the temperature rise of the light emitting part.

In order to solve such a problem, Japanese Laid-Open Patent Publication (kokai) No. 2002-291148 performs warning, operation prohibition, power shutdown, and the like when a difference between an internal temperature of a device and an environmental temperature is a predetermined value or more. In addition, Japanese Laid-Open Patent Publication (kokai) No. 2015-079883 switches the rotation speed of the cooling fan in accordance with a detected temperature difference between two positions near and far from a part that generates heat, in a case of a casing housed in the housing.

However, it is difficult to accurately identify the influence of heat generated by the latest light emission and the influence of the environmental temperature, only from the temperature of the heat generating pan and a difference between detected temperatures of two portions at different distances from the heat generating part. For this reason, there is room for improvement in a mechanism that appropriately suppresses the temperature rise of the light emitting part by controlling the cooling mechanism based on the temperature.

SUMMARY OF THE INVENTION

The present invention provides an illumination device and a control method therefor which are capable of appropriately suppressing a temperature rise of a light emitting part.

Accordingly, the present invention provides an illumination device comprising a light emitting part configured to emit light for illumination, a cooling part configured to cool the light emitting part, at least one memory, and at least one processor that executes instructions stored in the at least one memory to acquire a temperature at a first position, acquire a temperature at a second position that is less susceptible to a temperature change of the light emitting part than the first position, determine presence or absence of light emission of the light emitting part, and control driving of the cooling part based on the acquired temperature at the first position, the acquired temperature at the second position, and a determination result of the presence or absence of light emission.

According to the present invention, the temperature rise of the light emitting part can be appropriately suppressed.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

First Embodiment

Figure 1:
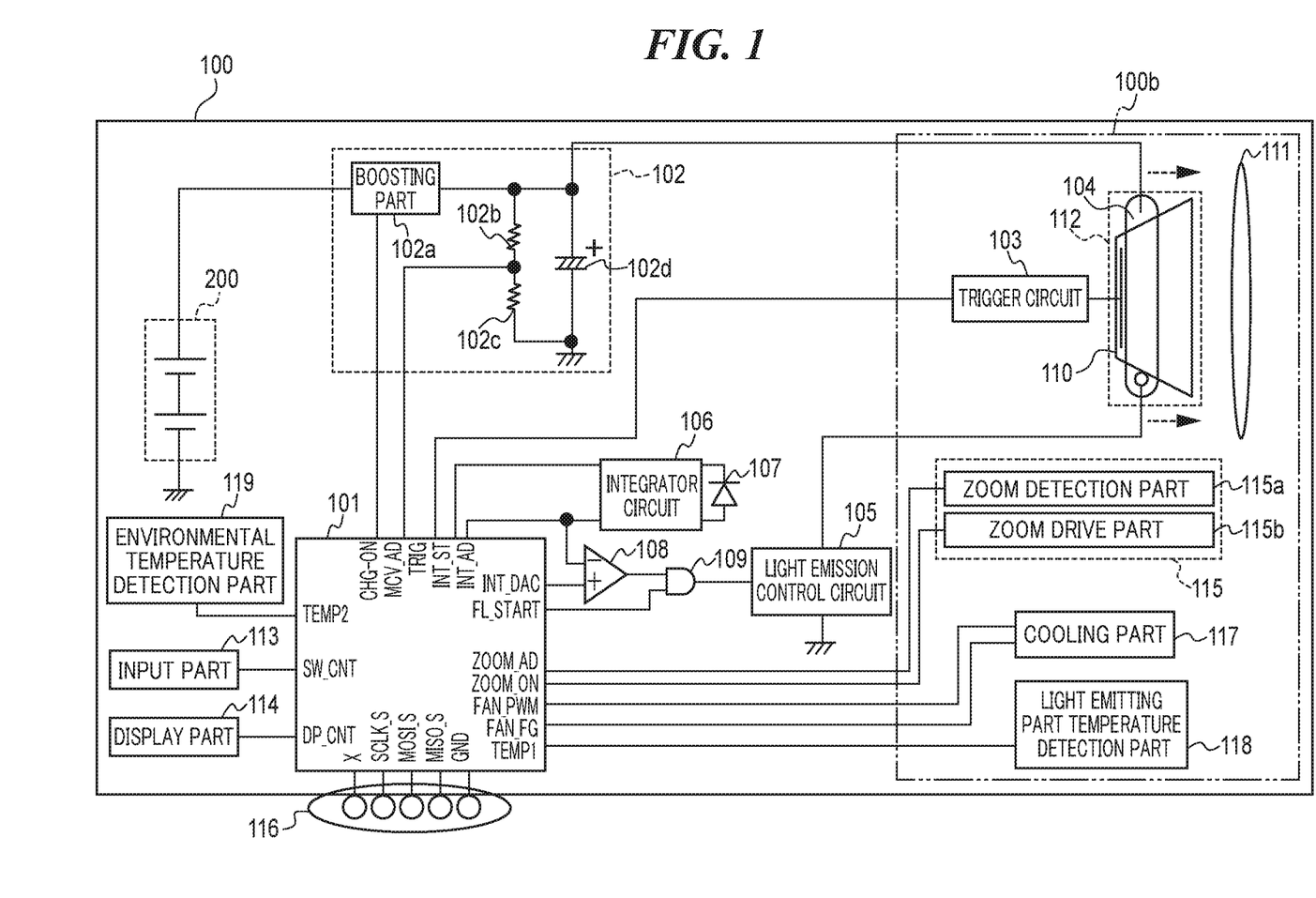
FIG. 1 is a block diagram showing a schematic configuration of an illumination device.
Figure 2:
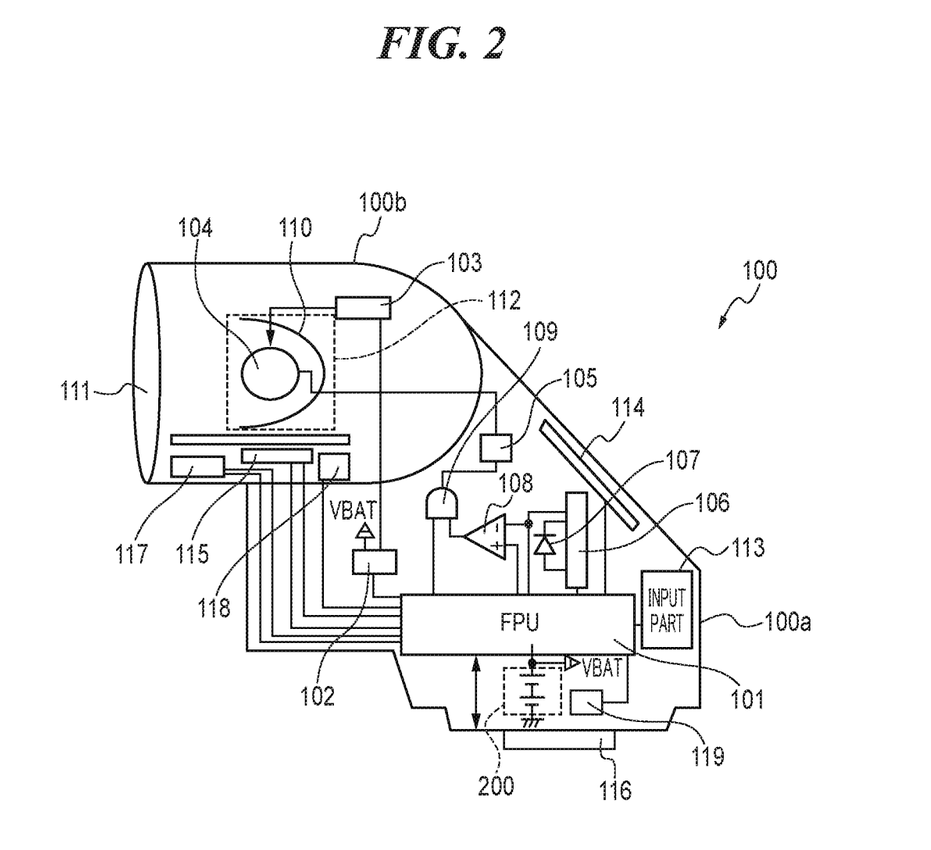
FIG. 2 is a diagram showing a schematic configuration of a strobe device.

FIG. 1 is a block diagram showing a schematic configuration of an illumination device according to a first embodiment of the invention. This illumination device is configured as a strobe device 100. FIG. 2 is a diagram showing a schematic configuration of the strobe device 100. In FIGS. 1 and 2, the same elements are denoted by the same reference numerals.

The strobe device 100 includes a main body 100a that is detachably attached to a camera body (not shown), and a light emitting part 100b that is rotatably held in the vertical direction and the horizontal direction with respect to the main body 100a. It should be noted that a rotation direction of the light emitting part 100b is defined with a side connected to the light emitting part 100b in the main body 100a as the upper side, in the present embodiment. The strobe device 100 includes a microcomputer FPU (hereinafter, strobe microcomputer) 101.

The strobe microcomputer 101 performs the entire control of strobe device 100. The strobe microcomputer 101 is, for example, a one-chip IC circuit with a built-in microcomputer, which includes a CPU, a ROM, a RAM, an input/output control circuit (I/O control circuit), a multiplexer, a timer circuit, an EEPROM, and A/D and D/A converters.

A battery 200 functions as a power source (VBAT) for the strobe device 100. A booster circuit 102 includes a boosting part 102a, resistors 102b and 102c used for voltage detection, and a main capacitor 102d. The booster circuit 102 boosts a voltage of the battery 200 to several hundred volts by the boosting part 102a, and stores electric energy for light emission in the main capacitor 102d. A charging voltage of the main capacitor 102d is divided by the resistors 102b and 102c, and the divided voltage is input to an A/D conversion terminal of the strobe microcomputer 101. A trigger circuit 103 applies a pulse voltage for excitation of a discharge tube 104 to the discharge tube 104. A light emission control circuit 105 controls start and stop of light emission of the discharge tube 104. The discharge tube 104 is excited by receiving a pulse voltage of several kilovolts applied from the trigger circuit 103, and emits light using the electric energy stored in the main capacitor 102d.

A photodiode 107 is a sensor that receives light emitted from the discharge tube 104, receives the light emitted from the discharge tube 104 directly or through a glass fiber or the like, and outputs a detection output (current) corresponding to the amount of the emitted light. An integrator circuit 106 integrates the current that is the output of the photodiode 107. An output of the integrator circuit 106 is input to an inverting input terminal of a comparator 108 and an A/D converter terminal of the strobe microcomputer 101. A non-inverting input terminal of the comparator 108 is connected to a D/A converter terminal in the strobe microcomputer 101, and an output terminal of the comparator 108 is connected to one of input terminals of an AND gate 109. The other input terminal of the AND gate 109 is connected to a light emission control terminal of the strobe microcomputer 101, and an output terminal of the AND gate 109 is connected to the light emission control circuit 105.

An input part 113 includes operation units such as a power switch, a mode setting switch for setting an operation mode of the strobe device 100, and setting buttons for setting various parameters. The strobe microcomputer 101 executes various processes in response to an input to the input part 113. A display part 114 includes a liquid crystal device and a light emitting element. Information indicating each state of the strobe device 100 is displayed on the display part 114.

The light emitting part 100b of the strobe device 100 mainly includes a discharge tube 104, a reflector 110, and an optical panel 111, and emits light for illumination. A reflector unit 112 includes the reflector 110. A light distribution angle of the light emitting part 100b is changed by movement of the reflector unit 112, and an irradiation direction of the light emitting part 100b is changed by rotation of the light emitting part 100b with respect to the main body 100a.

A zoom drive circuit 115 includes a zoom detection part 115a and a zoom drive part 115b. The zoom detection part 115a detects information relating to a relative position between the reflector unit 112 and the optical panel 111 using an encoder or the like. The zoom drive part 115b moves the reflector unit 112 by a motor. The strobe microcomputer 101 obtains a driving amount of the reflector unit 112 based on a focal distance information of a taking lens obtained through the camera body.

The reflector 110 reflects the light emitted from the discharge tube 104 to be guided in a predetermined direction. A zoom optical system including an optical panel 111 and the like is held so as to be capable of changing the relative position between the discharge tube 104 and the reflector unit 112. It is possible to change a guide number and the light distribution angle of the strobe device 100 by changing the relative position between the reflector unit 112 and the optical panel 111.

A terminal 116 includes an SCLK_S terminal, a MOSI_S terminal, a MISO_S terminal, and a GND terminal. The SCLK_S terminal is a terminal for synchronization of communication between the camera body and the strobe device 100. The MOSI_S terminal is a terminal for transmission of data from the camera body to the strobe device 100. The MISO_S terminal is a terminal for reception of data transmitted from the strobe device 100. The GND terminal connects the camera body and the strobe device 100.

A cooling part 117 is a fan module configured to cool the optical panel 111, and is connected to a FAN_PWM terminal and a FAN_FG terminal of the strobe microcomputer 101. The strobe microcomputer 101 can change the amount of air to be output, by changing a rotation speed of a fan of the cooling part 117 by PWM control. In addition, rotation speed information is fed back to the strobe microcomputer 101, so that the rotation speed according to a rotation instruction can be maintained.

A light emitting part temperature detection part 118 is connected to the strobe microcomputer 101, and is arranged at a position inside the light emitting part 100b and where an optical path from the discharge tube 104 is not blocked. The light emitting part temperature detection part 118 detects (acquires) a temperature of the light emitting part 100b whose temperature rises due to light emission from the discharge tube 104. That is, the light emitting part temperature detection part 118 acquires a temperature at a first position in the vicinity of the light emitting part 100b. Temperature information on a temperature detected by the light emitting part temperature detection part 118 is transmitted to the strobe microcomputer 101 and stored in a built-in memory of the strobe microcomputer 101.

An environmental temperature detection part 119 detects an environmental temperature around the strobe device 100. The environmental temperature detection part 119 is connected to the strobe microcomputer 101, and is arranged at a position inside the main body 100a and where the influence of heat from the discharge tube 104 is little. That is, the environmental temperature detection part 119 acquires a temperature at a second position that is less susceptible to a temperature change of the light emitting part 100b than an arrangement position of the light emitting part temperature detection part 118. A spatial distance between the light emitting part 100b and the second position is longer than a spatial distance between the light emitting part 100b and the first position. It should be noted that, when there is a heat source other than the light emitting part 100b, it is preferable that the environmental temperature detection part 119 be arranged at a position where the influence of heat from the heat source other than the light emitting part 100b is little. Temperature information on a temperature detected by the environmental temperature detection part 119 is transmitted to the strobe microcomputer 101 and stored in the built-in memory of the strobe microcomputer 101. It is desirable that the environmental temperature detection part 119 be thermally connected to a portion that does not serve as a handle of an exterior cover (enclosure). It should be noted that a temperature detected by another temperature detection part in the main body 100a may be handled as the environmental temperature to achieve space-saving.

Figure 3:
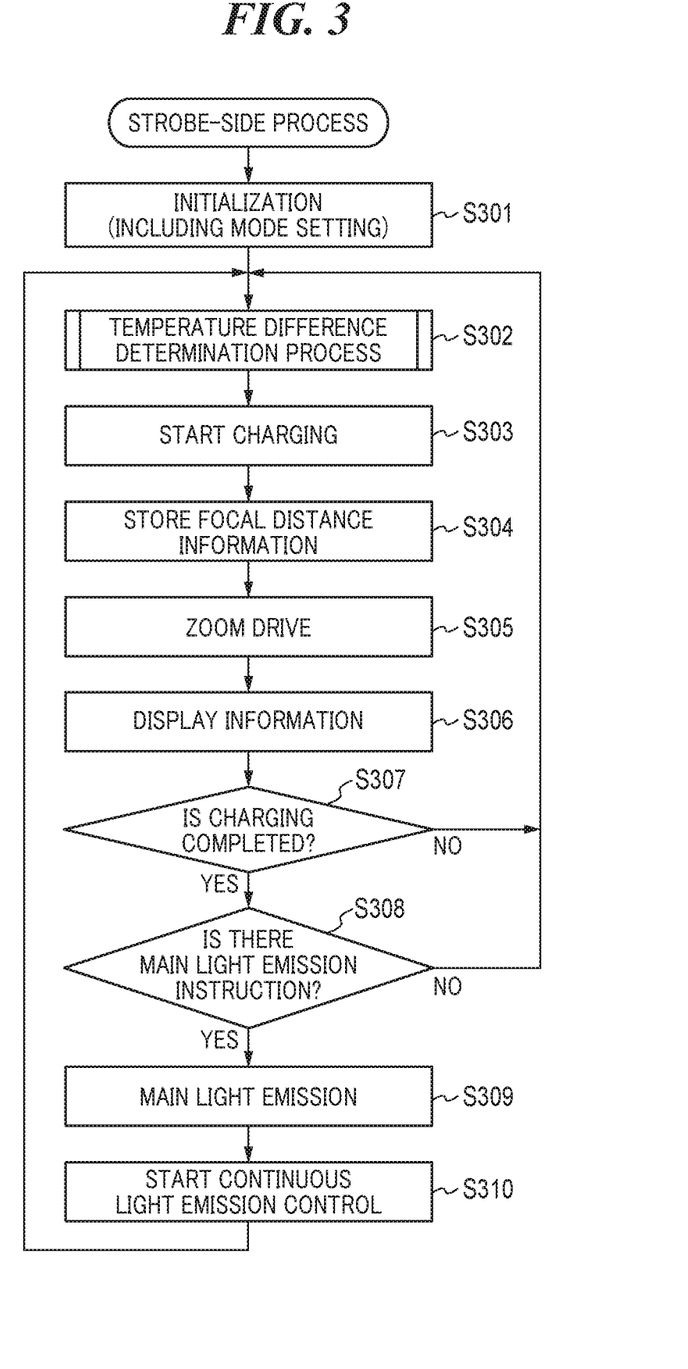
FIG. 3 is a flowchart of a strobe-side process.

FIG. 3 is a flowchart of a strobe-side process. An operation associated with light emission of the strobe device 100 will be described with reference to FIG. 3. This strobe-side process is realized by the CPU developing and executing a program stored in the ROM to the RAM in the strobe microcomputer 101. This process is started when the power switch included in the input part 113 is turned on and the strobe microcomputer 101 becomes operable.

First, the strobe microcomputer 101 initializes a memory and a port of the strobe microcomputer 101 itself in step S301. The strobe microcomputer 101 also reads states of the switches included in the input part 113 and preset input information, and sets various light emission modes such as how to determine a light emission amount and a light emission timing. In step S302, the strobe microcomputer 101 executes a temperature difference determination process (which will be described later in FIG. 4). In this temperature difference determination process, the driving of the cooling part 117 is controlled based on each piece of the temperature information on a temperature detected by the light emitting part temperature detection part 118 and the environmental temperature detection part 119 and a result of light emission determination, of which details will be described later. In this temperature difference determination process, the strobe microcomputer 101 stores the acquired pieces of temperature information, the determination result of the temperature difference determination process, and the result of light emission determination in the memory built in the strobe microcomputer 101 itself. The light emission determination will be described later with reference to FIG. 7.

Next, the strobe microcomputer 101 starts the operation of the booster circuit 102 and starts charging the main capacitor 102d in step S303. Next, the strobe microcomputer 101 stores the focal distance information of the taking lens (not shown) acquired from the camera microcomputer (not shown) via the terminal 116 in the built-in memory of the strobe microcomputer 101 in step S304. It should be noted that, in a case where the previous focal distance information is already stored, this focal distance information is updated with new focal distance information. In step S305, the strobe microcomputer 101 controls the zoom drive circuit 115 to move the reflector unit 112 such that the light distribution angle of strobe light falls within a range corresponding to the acquired focal distance information. It should be noted that step S305 can be omitted if it is not necessary to move the reflector unit 112.

In step S306, the strobe microcomputer 101 displays an image relating to the light emission mode set by the input part 113, an image relating to the acquired focal distance information, and the like on the display part 114. In addition, if an error occurs, such as failure in execution of driving of the cooling part 117 due to malfunction, although the driving of the cooling part 117 has been started in a temperature difference determination process to be described later, the strobe microcomputer 101 displays various warnings on the display part 114. In step S307, the strobe microcomputer 101 determines whether or not the charging of the main capacitor 102d has been completed. If the charging of the main capacitor 102d has been completed, the strobe microcomputer 101 transmits a charging completion signal to a camera microcomputer (not shown), and proceeds the process to step S308. On the other hand, if the charging of the main capacitor 102d has not been completed, the strobe microcomputer 101 returns the process to step S302.

In step S308, the strobe microcomputer 101 determines whether or not a light emission start signal as a main light emission instruction from the camera microcomputer (not shown) has been received. The strobe microcomputer 101 proceeds the process to step S309 if the light emission start signal has been received, and returns the process to step S302 if the light emission start signal has not been received. In step S309, the strobe microcomputer 101 issues a light emission instruction to the light emission control circuit 105 in response to the received light emission start signal. The light emission control circuit 105 causes the discharge tube 104 to emit light according to the light emission instruction. After completion of the light emission instruction, the strobe microcomputer 101 stores information relating to light emission such as voltage information of the main capacitor 102d in the built-in memory of the strobe microcomputer 101, and proceeds the process to step S310. It should be noted that if a series of light emission, such as pre-light emission for light control and main light emission, is instructed in step S309, the process returns to step S302 after completion of a series of light emission instructions instead of returning to step S302 each time when each light emission instruction is completed.

In step S310, the strobe microcomputer 101 starts continuous light emission control in which light emission or charging is controlled such that there is no abnormally excessive heat generation even if heat generated by light emission is continuously applied due to continuous light emission or the like. Details of the continuous light emission control will be described later with reference to FIG. 7. In this continuous light emission control, the strobe microcomputer 101 starts calculation when a value of a light emission counter (which will be described later) has changed from an initial state, and ends the calculation when a calculation result returns to the initial state. That is, the strobe microcomputer 101 starts calculating an assumed temperature of a target part from first light emission in order to assume a temperature of a part to be protected from the influence of heat generated by the light emission. Alternatively, the strobe microcomputer 101 starts calculating a counter integral amount of the light emission counter from the first light emission. Then, the calculation is continued in parallel with the strobe-side process of FIG. 3, until the time required for heat dissipation performed until the calculation result becomes the same as the initial state elapses, or until the time when the light emission counter is reset. Therefore, the same process as the continuous light emission control (FIG. 7) is also performed for single light emission although referred to as the continuous light emission control. The strobe microcomputer 101 starts the continuous light emission control, and then, returns the process to step S302.

Figure 4:
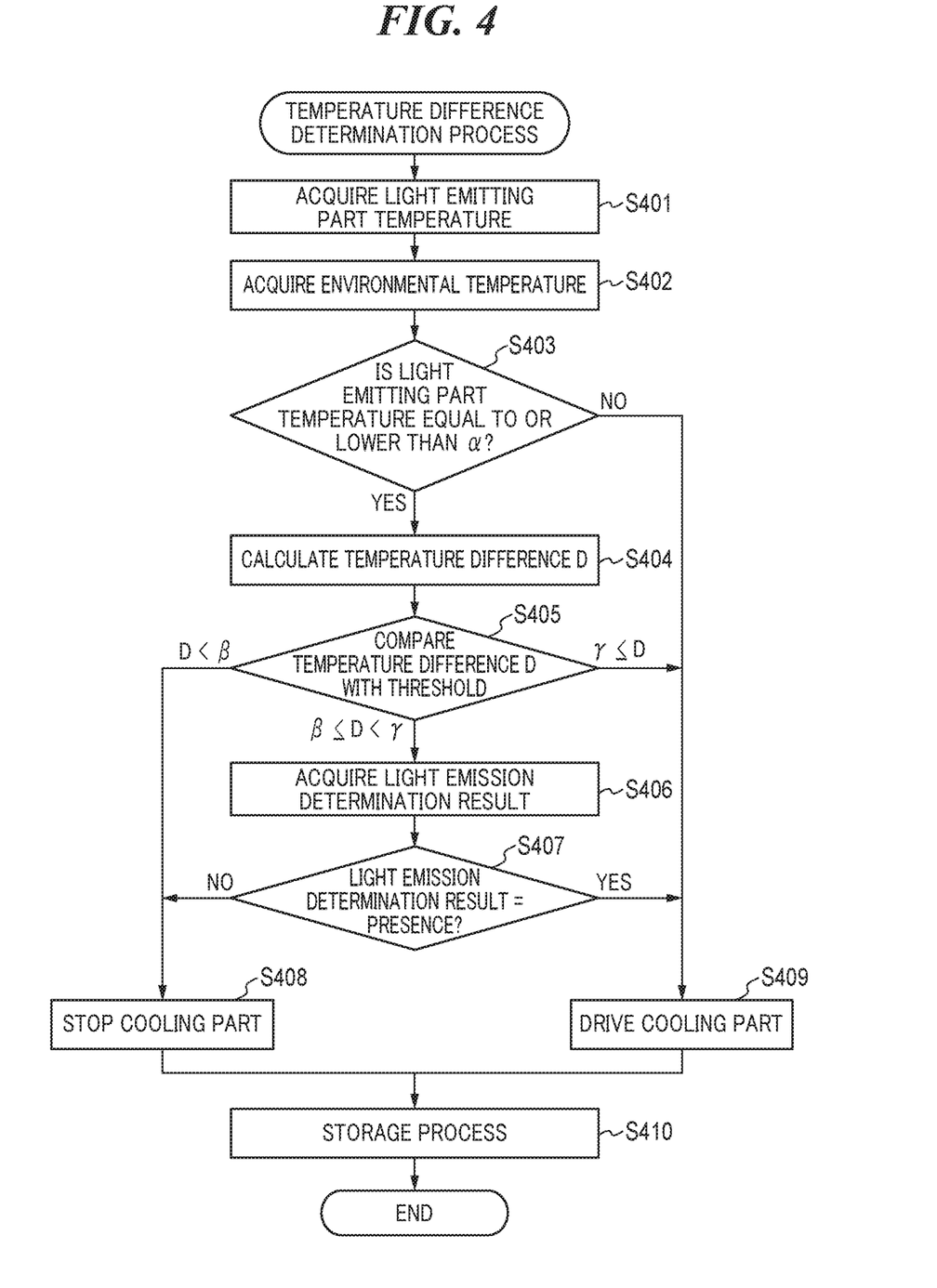
FIG. 4 is a flowchart of a temperature difference determination process.

FIG. 4 is a flowchart of the temperature difference determination process executed in step S302 of FIG. 3. In this temperature difference determination process, the strobe microcomputer 101 is a control unit. This temperature difference determination process will be outlined. First, the strobe microcomputer 101 obtains a temperature difference D that is a difference between output values of pieces of temperature information from the light emitting part temperature detection part 118 and the environmental temperature detection part 119. Then, the strobe microcomputer 101 determines how much degree of output with which the cooling part 117 is to be driven, or not to be driven by comparing the temperature difference D with each threshold. When the environmental temperature rises too much, it is difficult to expect a great cooling effect even if the cooling part 117 is driven, and thus, the strobe microcomputer 101 avoids an inefficient operation of the cooling part 117. On the other hand, the strobe microcomputer 101 efficiently cools the light emitting part 100b by driving the cooling part 117 when it is determined that the temperature of the light emitting part 100b has risen mainly due to the heat of light emission.

In step S401, the strobe microcomputer 101 acquires temperature information of the light emitting part 100b detected by the light emitting part temperature detection part 118 (hereinafter, referred to as "light emitting part temperature Tf"), and stores the acquired light emitting part temperature Tf in the built-in memory of the strobe microcomputer 101. In step S402, the strobe microcomputer 101 acquires temperature information detected by the environmental temperature detection part 119 (hereinafter, referred to as "environmental temperature Tc") via the main body 100a, and stores the acquired environmental temperature Tc in the built-in memory of the strobe microcomputer 101.

In step S403, the strobe microcomputer 101 determines whether or not the light emitting part temperature Tf, which is the acquisition result stored in step S401, is equal to or lower than a threshold α (Tf≤α). Here, the threshold α is set based on the correlation between an upper limit temperature and an output of the light emitting part temperature detection part 118 necessary for protection of the light emitting part 100b. It should be noted that the threshold α may be a fixed value. The strobe microcomputer 101 proceeds the process to step S404 in a case of Tf≤α as a result of the determination, and proceeds the process to step S409 in a case of α<Tf.

It should be noted that the output of the light emitting part temperature detection part 118 may be offset based on an output of the light emitting part temperature detection part 118 in an initial state of startup and an output of the environmental temperature detection part 119 in the initial state of startup. Then, the value thus offset may be used as the output of the light emitting part temperature detection part 118 when controlling the driving of the cooling part 117 in the temperature difference determination process (FIG. 4) (that is, may be treated as the light emitting part temperature T0. As a result, an output difference between the temperature detection parts 118 and 119 in the initial state of startup can be canceled.

In step S404, the strobe microcomputer 101 calculates a temperature difference D that is a difference between the light emitting part temperature Tf acquired in step S401 and the environmental temperature Tc that is the acquisition result acquired in step S402 (D=Tf−Tc). Then, the strobe microcomputer 101 stores the calculated temperature difference D in the built-in memory of the strobe microcomputer 101. In step S405, the strobe microcomputer 101 compares the temperature difference D stored in step S404 with a threshold (threshold β, γ, or δ) stored in the built-in memory of the strobe microcomputer 101, and causes the process to branch depending on a comparison result. The magnitude relationship among the thresholds β, γ, and δ is β<γ<δ.

The strobe microcomputer 101 proceeds the process to step S408 in a case of D<β as a result of the comparison, proceeds the process to step S406 in a case of β≤D<γ, and proceeds the process to step S409 in a case of γ≤D. It should be noted that the comparison result is stored in the built-in memory. In step S406, the strobe microcomputer 101 acquires a light emission determination result. The light emission determination result is information indicating whether or not the light emitting part 100b emits light (presence of light emission/absence of light emission), and is generated by a light emission determination process in step S704 of FIG. 7 to be described later. The light emission determination result is a scale to determine whether the light emitting part temperature Tf or the temperature difference D has been caused by the light emission of the discharge tube 104. By referring to the light emission determination result, the reliability of the drive control of the cooling part 117 based on the temperature difference D is enhanced.

In step S407, the strobe microcomputer 101 determines whether or not the light emission determination result acquired in step S406 indicates the presence of light emission. Then, the strobe microcomputer 101 proceeds the process to step S409 in a case where the light emission determination result indicates the presence of light emission, and proceeds the process to step S408 in a case where the light emission determination result indicates the absence of light emission.

Figure 5:
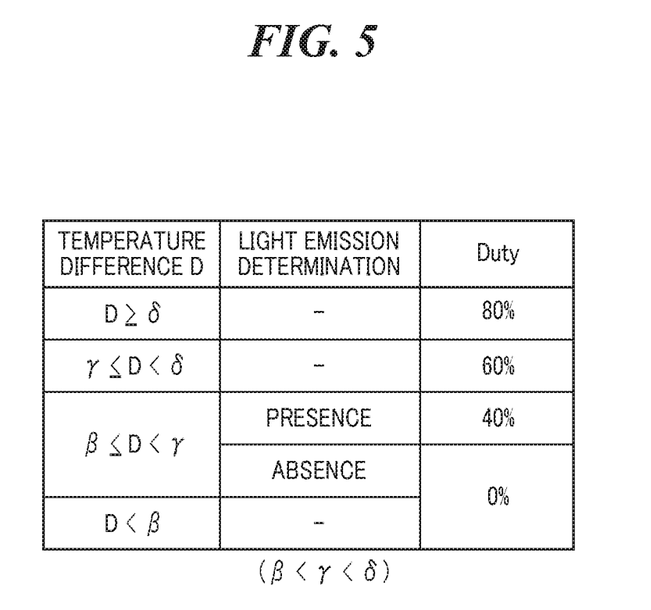
FIG. 5 is a diagram showing a setting example of a driving output of a cooling part.

FIG. 5 is a diagram showing a setting example of a driving output of the cooling part 117 based on the temperature difference D and the light emission determination result. First, a temperature difference region is divided as follows. A temperature difference region where the temperature difference D belongs to D<β is defined as a first region. A temperature difference region where the temperature difference D belongs to β≤D<γ is defined as a second region. A temperature difference region where the temperature difference D belongs to γ≤D is defined as a third region. The magnitude relationship among the temperature difference regions is as follows: first region<second region<third region. Basically, the strobe microcomputer 101 varies a duty for driving the cooling part 117 by the PWM signal, depending on which region the temperature difference D belongs to, and sets the duty more finely in accordance with the light emission determination result.

As shown in FIG. 5, the duty is set to 0% (that is, the driving is stopped) in a case where the temperature difference D is less than the threshold β, and belongs to the first region. In a case where the temperature difference D is equal to or greater than the threshold β and less than γ, and belongs to the second region, the duty is set to 0% if the light emission determination result indicates the absence of light emission, and the duty is set to 40% if the light emission determination result indicates the presence of light emission. In a case where the temperature difference D belongs to a region that is less than the threshold δ in the third region, the duty is set to 60%. In a case where the temperature difference D belongs to a region that is equal to or greater than the threshold δ in the third region, the duty is set to 80%.

Figure 6:
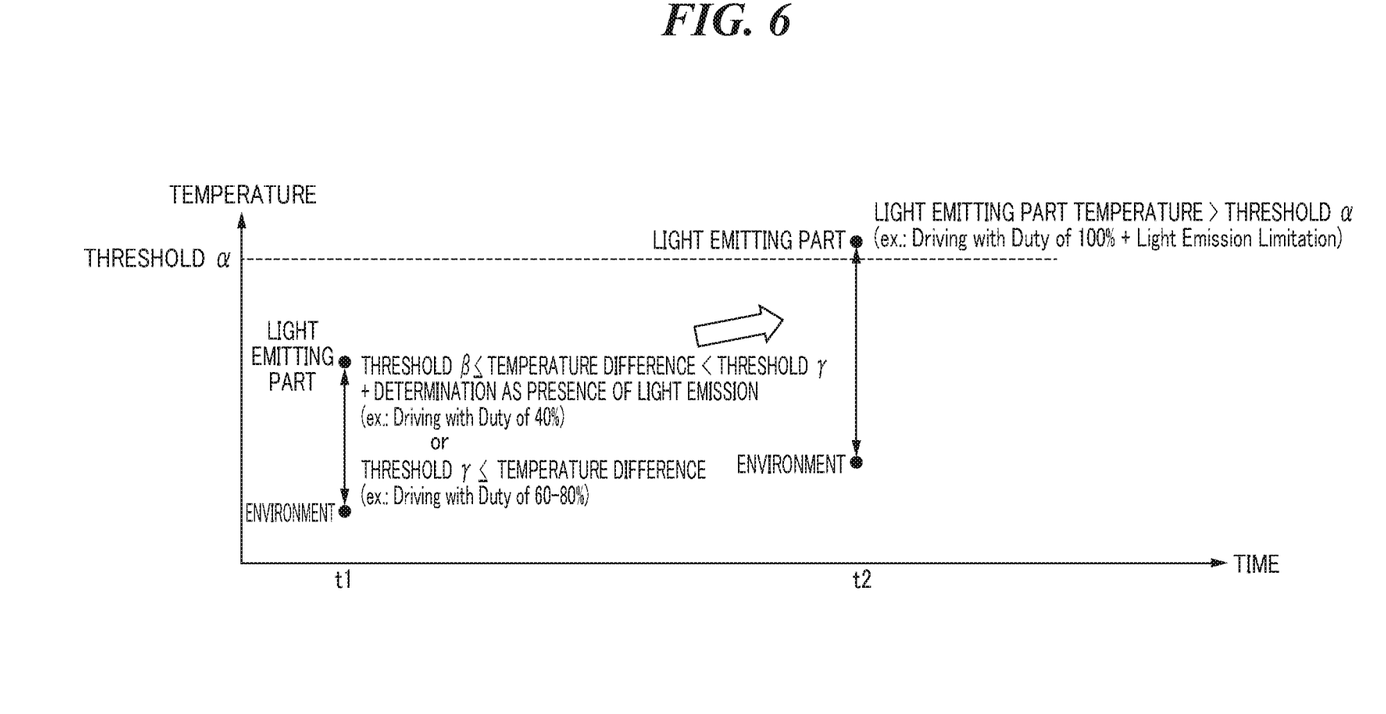
FIG. 6 is a diagram showing a specific example of duty setting in accordance with a light emitting part temperature, a temperature difference, and a light emission determination result.

FIG. 6 is a diagram showing a specific example of duty setting in accordance with the light emitting part temperature Tf, the temperature difference D, and the light emission determination result. The example of FIG. 6 shows a change in the output of the cooling part 117 when transition is made from time t1 at which the light emitting part temperature Tf does not exceed the threshold α to time t2 at which the light emitting part temperature Tf exceeds the threshold α.

The light emitting part temperature Tf does not exceed the threshold α at the time t1, and thus the process proceeds from step S403 to step S404. Thus, the duty to drive the cooling part 117 is controlled based on the temperature difference D. On the other hand, the light emitting part temperature Tf exceeds the threshold α at the time t2, and thus the process proceeds from step S403 to step S409. In this case, the strobe microcomputer 101 raises the driving output of the cooling part 117 to an upper limit to give priority to protection of the light emitting part 100b. That is, the strobe microcomputer 101 drives the cooling part 117 with the duty of 100%, which is the maximum output, in step S409 when the process has proceeded from step S403 to step S409.

It should be noted that the duty at the time of transition from S403 to S409 is not limited to 100%. For example, the cooling part 117 may be driven with an output equal to or higher than the highest output, which is used at the time of driving the cooling part 117 in accordance with the temperature difference D and the light emission determination result. According to the example of FIG. 5, when Tf≤α, the maximum duty value that can be set in accordance with the temperature difference D and the light emission determination result is 80%. Therefore, the cooling part 117 may be driven with an output equal to or higher than duty of 80% in the case of the transition from S403 to S409. Furthermore, a temperature rise of the light emitting part 100b may be suppressed by using the light emission limitation together. The light emission limitation is control for increasing an interval to prohibit light emission (hereinafter, "shortest light emission interval"). The strobe microcomputer 101 makes the light emission interval of the light emitting part 100b longer when α<Tf than when Tf≤α. Although the light emission limitation is used together at the time t2 when α<Tf in the example of FIG. 6, the light emission limitation may be used together at the time t1 when the light emitting part temperature Tf does not exceed the threshold α. The light emission limitation is advantageous for protection of the light emitting part 100b and the optical panel 111 from the influence of heat generated by the light emission of the discharge tube 104.

Based on the examples of FIGS. 5 and 6, the flow of FIG. 4 can be summarized as follows. In a case of α<Tf in step S403, the strobe microcomputer 101 drives the cooling part 117 with the duty of 100% regardless of the magnitude of the temperature difference D in step S409 as described above. In a case of Tf≤α and D<β in step S405, the strobe microcomputer 101 stops driving the cooling part 117 in step S408. In a case of Tf≤α, β≤D<γ in step S405, and "light emission determination result=absence of light emission" in step S407, the strobe microcomputer 101 stops driving the cooling part 117 in step S408. In a case of Tf≤α, β≤D<γ in step S405, and "light emission determination result=presence of light emission" in step S407, the strobe microcomputer 101 drives the cooling part 117 with the duty of 40% in step S409. In a case of Tf≤α, γ≤D in step S405, the strobe microcomputer 101 drives the cooling part 117 with the duty of 60% if γ≤D<δ, with the duty of 80% if δ≤D, in step S409.

As can be seen from FIG. 5, when γ≤D, the duty does not become 0% even if there is no light emission, that is, the driving of the cooling part 117 is not stopped. This is because the case where the light emission counter (which will be described later in FIG. 7) is reset after continuous light emission is taken into consideration. For example, when the light emission counter is reset due to removal of the battery or the like, there is a case where it is determined as the absence of light emission although it should be originally determined as the presence of light emission. Even in this case it is possible to ensure the driving of the cooling part 117.

After step S408 or step S409, the strobe microcomputer 101 stores the determination results in steps S403, S405, and S407 in the built-in memory of the strobe microcomputer 101 in step S410, and ends the temperature difference determination process in FIG. 4.

Figure 7:
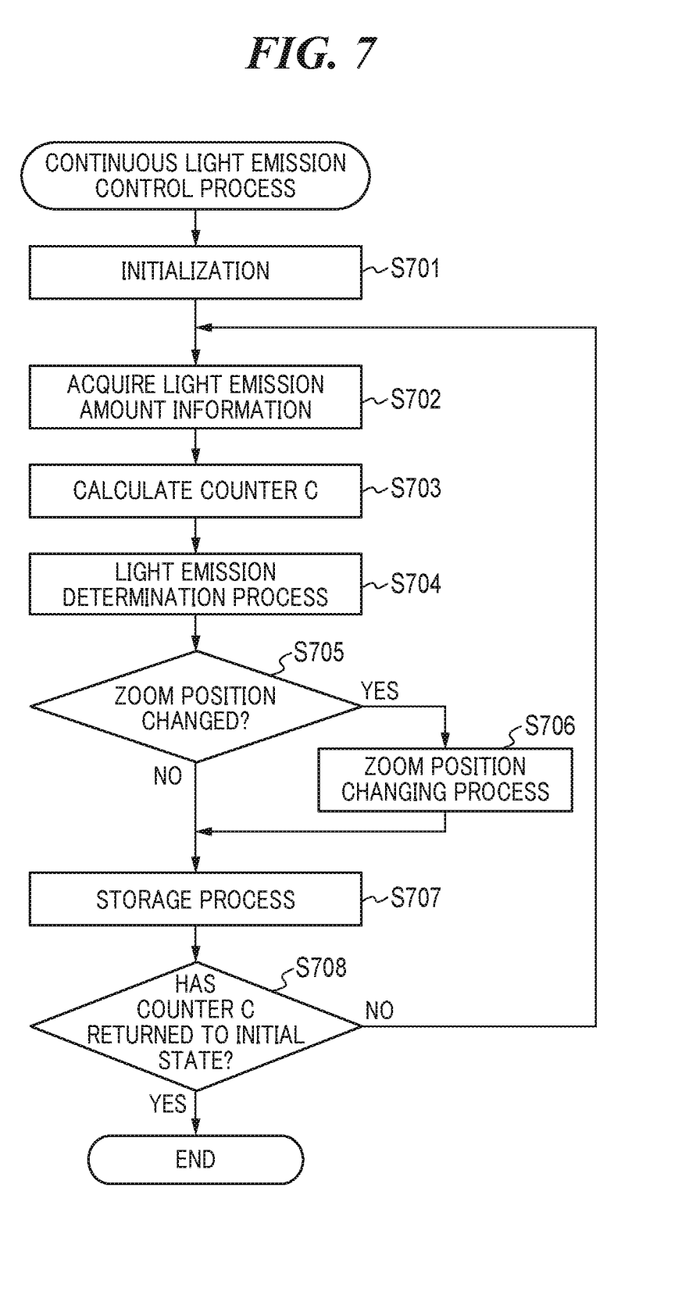
FIG. 7 is a flowchart of a continuous light emission control process.

FIG. 7 is a flowchart of a continuous light emission control process. This process is realized by the CPU developing and executing a program stored in the ROM to the RAM in the strobe microcomputer 101. When the discharge tube 104 emits light in step S310 in FIG. 3, the strobe microcomputer 101 starts the continuous light emission control process shown in FIG. 7 and executes the continuous light emission control process in parallel with the strobe-side process in FIG. 3.

First, the strobe microcomputer 101 initializes settings relating to continuous light emission control in step S701. The strobe microcomputer 101 reads preset input information and parameters. It should be noted that this step can be omitted if reading has already been performed in step S301 in FIG. 3.

In step S702, the strobe microcomputer 101 acquires information on the light emission amount of the discharge tube 104 at the time of light emission (light emission amount information), and stores the acquired light emission amount information in the built-in memory of the strobe microcomputer 101. In step S703, the strobe microcomputer 101 calculates a counter integral amount C based on the temperature difference D stored in step S404 as calculation for the continuous light emission process. The counter integral amount C is calculated by Formula 1.

$$C=(FL \times \varepsilon \times n - T \times M) \times (\zeta \times D + 1) \quad (1)$$

Wherein, FL is a light emission amount, ε and ζ are adjustment coefficients, n is a light emission count, T is a time interval to perform subtraction, M is a subtraction amount, and D is a temperature difference. According to Formula 1, for example, the strobe microcomputer 101 sets the coefficients for calculation range adjustment with respect to the light emission amount information acquired in step S702, and integrates these values every light emission. As for the subtraction, a predetermined amount is subtracted every predetermined time. A value according to the temperature difference D is integrated to the integrated light emission counter in this manner, and thus the integral amount of the light emission counter increases when the temperature difference is large. As a result, the integral amount of the light emission counter can be calculated while take a change of a state caused by an actual temperature into account. Due to the light emission of the light emitting part 100b, the light emission amount FL and the light emission count n in Formula 1 change from 0 (zero) to a positive value, and the integration of the counter integral amount C is started. Therefore, the light emission counter starts counting due to the light emission.

Specifically, the counter integral amount C increases in accordance with "light emission amount×light emission count" of the light emitting part 100b. The counter integral amount C decreases as the longer time elapses after the light emission of the light emitting part 100b. The counter integral amount C increases as the temperature difference D increases. The calculation result of the counter integral amount C is stored in the built-in memory of the strobe microcomputer 101.

Next, the strobe microcomputer 101 executes the light emission determination process in step S704. That is, the strobe microcomputer 101 determines whether or not the counter integral amount C exceeds a predetermined value Tt (Tt<C), and generates a determination result as a light emission determination result. The determination result is generated as the presence of light emission when Tt<C and the absence of light emission when Tt≥C. The generated light emission determination result (presence of light emission/absence of light emission) is stored in the built-in memory of the strobe microcomputer 101.

It should be noted that the process of determining the presence or absence of light emission is not limited to this example. For example, the presence or absence of light emission may be determined by a bit set according to light emission within a unit time. This bit is continuously set until a predetermined time has elapsed after the light emission. Therefore, the strobe microcomputer 101 may determine as "presence of light emission" if the light emitting part 100b emits light at least once within the latest predetermined time, and "absence of light emission" if there is no light emission.

It should be noted that the predetermined value Tt may be a fixed value. However, the predetermined value Tt may be set in conjunction with the threshold α (S403). In this case, it is possible to enhance a heat generation suppression effect with cooling control and light emission limitation control by extending the shortest light emission interval at the time of performing the light emission limitation in a stepwise manner. For example, the strobe microcomputer 101 extends the shortest light emission interval in the case where the light emission determination result indicates the presence of light emission more than that in the case where the light emission determination result indicates the absence of light emission.

In step S705, the strobe microcomputer 101 determines whether or not a zoom position has changed since the main light emission in step S309. In a case where there is no change in the zoom position, the strobe microcomputer 101 proceeds the process to step S707. In a case where there is a change in the zoom position, the strobe microcomputer 101 performs a zoom position changing process in step S706. The strobe microcomputer 101 stores a threshold corresponding to each zoom position in a storage part. This zoom position changing process is a process for adjusting the counter integral amount C in accordance with the change of the zoom position. As a result, when the zoom position is moved between a zoom position where a large threshold is set and a zoom position where a small threshold is set, an integration ratio of the counter integral amount C to each threshold can be made uniform. When putting SP as a threshold before the zoom position change and putting SA as a threshold after the change, the counter integral amount C is converted by Formula 2.

$$C=C \times SA/SP \quad \text{(Formula 2)}$$

After the zoom position changing process, the strobe microcomputer 101 stores a processing result in the built-in memory of the strobe microcomputer 101. After step S706, the strobe microcomputer 101 proceeds the process to step S707. In step S707, the strobe microcomputer 101 stores various calculation results and parameters in the built-in memory of the strobe microcomputer 101. It should be noted that this step may be omitted if the storage has already been done. Next, in step S708, the strobe microcomputer 101 determines whether or not the counter integral amount C has returned to the initial state. When the value C calculated by Formula 1 becomes 0 (zero), it is determined that the counter integral amount C has returned to the initial state. For example, after the last light emission, the value C becomes 0 due to the effect of the subtraction term "−T×M" after a lapse of time. Alternatively, the value C becomes zero when the power is turned on. In such a case, it is determined that the counter integral amount C has returned to the initial state.

In a case where the counter integral amount C has not returned to the initial state, the strobe microcomputer 101 returns the process to step S702. In a case where the counter integral amount C has returned to the initial state, the strobe microcomputer 101 ends the continuous light emission control process shown in FIG. 7.

According to the present embodiment, the strobe microcomputer 101 controls the driving of the cooling part 117 based on the light emitting part temperature Tf, the environmental temperature Tc, and the result of the light emission determination. Specifically, the strobe microcomputer 101 controls the driving of the cooling part 117 based on the temperature difference D and the presence or absence of light emission. Basically, the strobe microcomputer 101 varies the magnitude (duty) of the output at the time of driving the cooling part 117 in accordance with the region to which the temperature difference D belongs (FIG. 5), and thus, it is possible to realize the appropriate cooling according to the temperature difference D. In addition, the strobe microcomputer 101 varies the duty depending on whether the result of the light emission determination indicates the presence of light emission or the absence of light emission, depending on the region to which the temperature difference D belongs. For example, in the case of $\beta \leq D < \gamma$, the duty is set to 0% (driving is stopped) if the light emission determination result indicates the absence of light emission, and the duty is set to 40% if the light emission determination result indicates the presence of light emission. As a result, it is possible to perform the cooling control in consideration of the influence on the temperature rise caused by the latest light emission of the light emitting part 100b, and thus, it is possible to avoid inefficient driving of the cooling part and to realize the efficient cooling. Therefore, the temperature rise of the light emitting part can be appropriately suppressed.

In the case of $\alpha<Tf$, the driving output of the cooling part 117 is set to the duty of 100% regardless of the magnitude of the temperature difference D (S403 to S409), and thus, the protection of the light emitting part 100b is prioritized. In the case of $\gamma \leq D$, the driving of the cooling part 117 is not stopped even if there is no light emission (S405 to S409), and thus, the cooling of the light emitting part 100b is ensured.

It should be noted that although the strobe microcomputer 101 has the one-chip IC circuit configuration with the built-in microcomputer, a dedicated microcomputer memory or the like may be provided in accordance with each function. In addition, although the cooling part 117 was described above as the fan module, the cooling part 117 may be a cooling module having an equivalent function such as a pump. It should be noted that each of the described flowcharts is merely an example, and the respective steps may be executed in a different order from each of the flowcharts if there is no problem.

It should be noted that although the driving of the cooling part 117 is stopped in a case of $\beta \leq D < \gamma$ and the light emission determination result=absence of light emission (S407 to S408), the cooling part 117 may be driven with a duty lower than the duty (40%) of the case of $\beta \leq D < \gamma$ and the light emission determination result=presence of light emission.

Second Embodiment

In the first embodiment, the second position is the position that is inside the strobe device 100 and that is less susceptible to the temperature change of the light emitting part 100b than the first position. However, the second position is not necessarily positioned inside the strobe device 100, but may be positioned inside a camera body or inside an external power supply device connected to the strobe device 100. The second embodiment of the present invention is different from the first embodiment in terms that an environmental temperature is acquired from a device connected to the strobe device 100. The other configurations are the same as those of the first embodiment. The second embodiment will be described with reference to FIG. 8 instead of FIG. 1.

Figure 8:
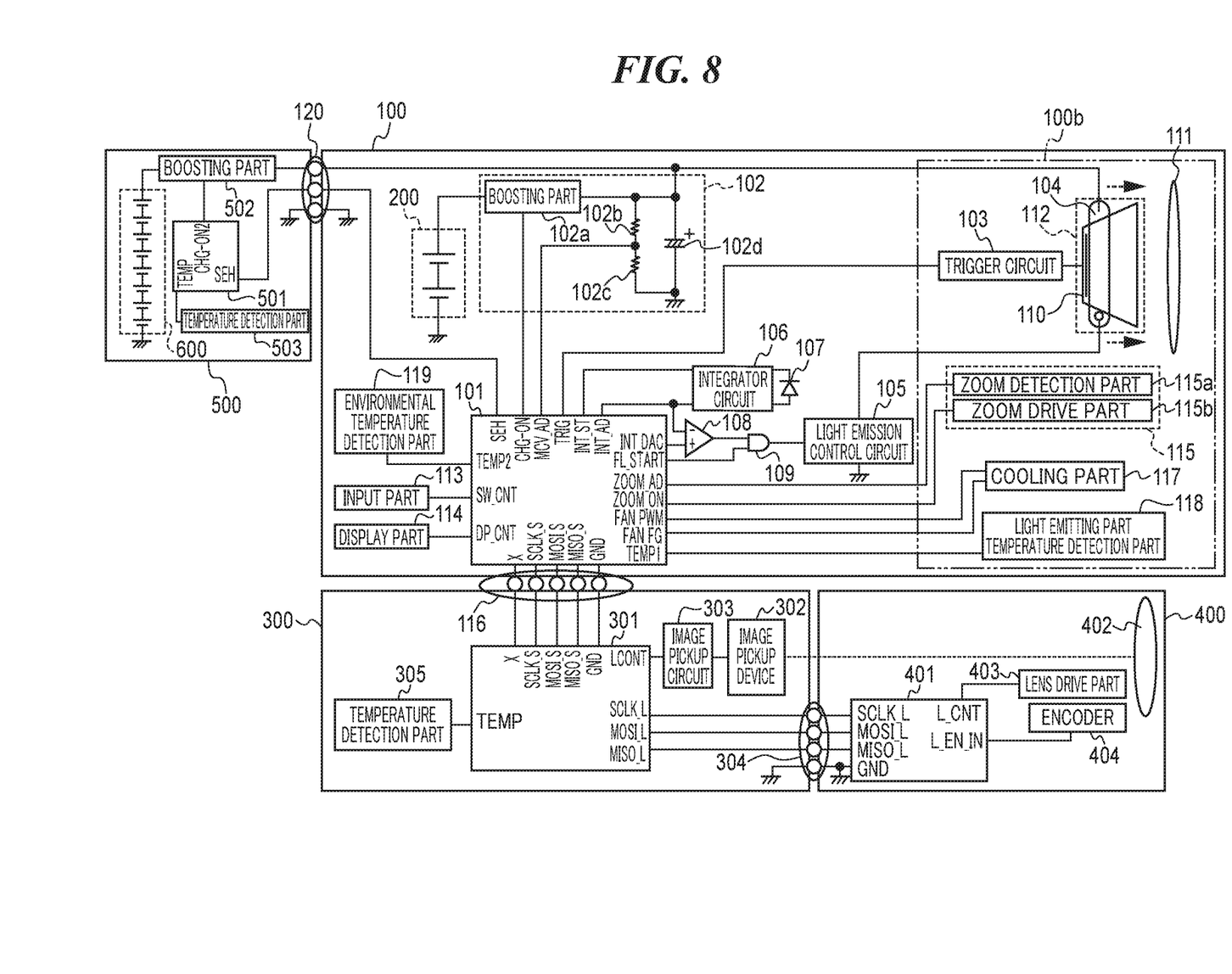
FIG. 8 is a block diagram showing a schematic configuration of a camera system including the strobe device.

FIG. 8 is a block diagram showing a schematic configuration of a camera system including the strobe device 100. In this camera system, the same components as those in FIG. 1 are denoted by the same reference numerals. A camera body 300 and an external power supply device 500 are connected to the strobe device 100. The strobe microcomputer 101 acquires the environmental temperature from the camera body 300 or the external power supply device 500. The external power supply device 500 is electrically connected to terminals 120 of strobe device 100. The camera body 300 is electrically connected to the terminal 116 of the strobe device 100. A lens unit 400 is electrically connected to terminals 304 of the camera body 300.

The terminals 120 include a signal terminal (SEH) that inputs and outputs a signal to control the strobe device 100 and the external power supply device 500, and a highvoltage power input terminal (HV) to supply power to the main capacitor 102d. In addition, the terminals 120 also include a GND terminal that connects the strobe device 100 and the external power supply device 500 to each other.

Next, a configuration of the camera body 300 will be described. A microcomputer CCPU (hereinafter, camera microcomputer) 301 controls each part of the camera body 300. The camera microcomputer 301 is, for example, a one-chip IC circuit with a built-in microcomputer, which includes a CPU, a ROM, a RAM, an input/output control circuit (I/O control circuit), a multiplexer, a timer circuit, an EEPROM, A/D and D/A converters, and the like. The camera microcomputer 301 controls the camera system with software and performs various condition determinations.

An image pickup device 302 is an image pickup device such as a CCD, a CMOS, or the like, including an infrared cut filter, a low-pass filter, and the like, and on which a subject image is formed at the time of shooting by a lens group 402 to be described later. An image pickup circuit 303 includes, for example, a gain switching circuit, an A/D converter, a timing generator, a signal processing circuit, and the like, and performs various image pickup processes.

The terminals 304 include an SCLK_L terminal for synchronization of communication between the camera body 300 and the lens unit 400, an MOSI_L terminal for transmission of data to the lens unit 400, and an MISO_L terminal for reception of data transmitted from the lens unit 400. In addition, the terminals 304 also include a GND terminal that connects the camera body 300 and the lens unit 400 to each other.

A temperature detection part 305 detects a temperature inside the camera body 300. It is desirable to arrange the temperature detection part 305 at a portion (such as a top cover) away from the image pickup device 302 and the image pickup circuit 303 so as not to be easily affected by the temperature of an image pickup system. Temperature information on a temperature detected by the temperature detection part 305 is transmitted to the camera microcomputer 301 and stored in the built-in memory of the camera microcomputer 301.

Next, a configuration and an operation of the lens unit 400 will be described. A microcomputer LPU (hereinafter a lens microcomputer) 401 controls each part of the lens unit 400. The lens microcomputer 401 is, for example, a one-chip IC circuit with a built-in microcomputer, which includes a CPU, a ROM, a RAM, an input/output control circuit (I/O control circuit), a multiplexer, a timer circuit, an EEPROM, A/D and D/A converters, and the like. The lens group 402 consists of a plurality of lenses including a focus lens, a zoom lens, and the like. It should be noted that the lens group 402 does not necessarily include the zoom lens.

A lens drive part 403 is a drive system that moves the lenses included in the lens group 402. A driving amount of the lens group 402 is calculated by the camera microcomputer 301 based on an output of the image pickup device 302 in the camera body 300 or a focus detection circuit (not shown). The calculated driving amount is transmitted from the camera microcomputer 301 to the lens microcomputer 401. An encoder 404 detects a position of the lens group 402 and outputs driving information. The lens drive part 403 moves the lens group 402 by the driving amount based on the driving information output from the encoder 404 to adjust the focus.

Next, a configuration of the external power supply device 500 will be described. A microcomputer FPU (hereinafter, external power supply microcomputer) 501 controls each part of the external power supply device 500. The external power supply microcomputer 501 is, for example, a one-chip IC circuit with a built-in microcomputer, which includes a CPU, a ROM, a RAM, an input/output control circuit (I/O control circuit), a multiplexer, a timer circuit, an EEPROM, A/D and D/A converters, and the like. A battery 600 functions as a power supply (VBAT) for the external power supply device 500. A voltage of the battery 600 is boosted to several hundred volts by a boosting part 502, and then, is sent to the strobe device 100 via the terminal 120 to store electric energy in the strobe device 100. A temperature detection part 503 detects a temperature in the external power supply device 500. It is desirable to arrange the temperature detection part 503 at a position that is not easily affected by the temperature of the boosting part 502 and the battery 600. Temperature information on a temperature detected by the temperature detection part 503 is transmitted to the external power supply microcomputer 501 and stored in the built-in memory of the external power supply microcomputer 501.

In a temperature difference determination process (FIG. 4) according to the present embodiment, a process in step S402 is different from that in the first embodiment. In step S402 in FIG. 4, the strobe microcomputer 101 acquires the temperature information on a temperature detected by the temperature detection part 305 of the camera body 300 via the terminal 116, and stores the acquired temperature information in the built-in memory of the strobe microcomputer 101 as the environmental temperature Tc. In the steps subsequent to step S403, the strobe microcomputer 101 handles the temperature information on a temperature detected by the temperature detection part 305 as the environmental temperature Tc instead of the temperature information on a temperature detected by the environmental temperature detection part 119 of the first embodiment.

It should be noted that the strobe microcomputer 101 may acquire the temperature information detected by the temperature detection part 503 of the external power supply device 500 via the terminal 120 and store the acquired temperature information in the built-in memory of the strobe microcomputer 101 as the environmental temperature Tc, in step S402. Alternatively, the strobe microcomputer 101 may acquire at least two pieces out of temperature information detected by the environmental temperature detection part 119, the temperature detection part 305, or the temperature detection part 503, and handle one of the acquired pieces of temperature information as the environmental temperature Tc. In such a case, for example, the lowest value among the acquired pieces of temperature information may be handled as the environmental temperature Tc. By handling the lowest value as the environmental temperature Tc, it is possible to use a value, which enables the influence of heat received by each temperature detection part from each device to be the minimum, as the environmental temperature.

According to the present embodiment, the same effects as those of the first embodiment can be achieved with respect to appropriate suppression of a temperature rise of a light emitting part.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036138, filed Feb. 28, 2019, which is hereby incorporated by reference wherein in its entirety.

What is claimed is:

1. An illumination device comprising:
a light emitting part configured to emit light for illumination;
a cooling part configured to cool the light emitting part;
at least one memory; and
at least one processor that executes instructions stored in the at least one memory to:
acquire a temperature at a first position;
acquire a temperature at a second position that is less susceptible to a temperature change of the light emitting part than the first position;
determine presence or absence of light emission of the light emitting part; and
control driving of the cooling part based on the acquired temperature at the first position, the acquired temperature at the second position, and a determination result of the presence or absence of light emission,
wherein, counting by a light emission counter is started due to light emission of the light emitting part, and it is determined as the presence of light emission in a case where a value of the light emission counter exceeds a predetermined value, and it is determined as the absence of light emission in a case where the value of the light emission counter does not exceed the predetermined value.

2. The illumination device according to claim 1, wherein the at least one processor executes instructions to control the driving of the cooling part based on a difference between the acquired temperature at the first position and the acquired temperature at the second position, and the determination result of the presence or absence of light emission.

3. The illumination device according to claim 2, wherein the at least one processor executes instructions to vary a magnitude of an output used when driving the cooling part, in accordance with a temperature difference region to which the difference belongs.

4. The illumination device according to claim 2, wherein the at least one processor executes instructions to:
stop driving of the cooling part in a case where the difference belongs to a first temperature difference region; and
in a case where the difference belongs to a second temperature difference region higher than the first temperature difference region, drive the cooling part when the determination result of the presence or absence of light emission indicates the presence of light emission, and stop driving of the cooling part when the determination result of the presence or absence of light emission indicates the absence of light emission.

5. The illumination device according to claim 4, wherein the at least one processor executes instructions to drive the cooling part regardless of the determination result of the presence or absence of light emission in a case where the difference belongs to a third temperature difference region higher than the second temperature difference region.

6. The illumination device according to claim 2, wherein the at least one processor executes instructions to, in a case where the acquired temperature at the first position exceeds a threshold, drive the cooling part with an output equal to or higher than a highest output, which is used at the time of driving the cooling part based on the difference and the determination result of the presence or absence of light emission, regardless of the acquired temperature at the second position and the determination result of the presence or absence of light emission.

7. The illumination device according to claim 1, wherein the first position is a position where an optical path from the light emitting part is not blocked.

8. The illumination device according to claim 1, wherein a spatial distance between the light emitting part and the second position is longer than a spatial distance between the light emitting part and the first position.

9. The illumination device according to claim 1, wherein the second position is located inside a camera body or inside an external power supply device connected to the illumination device.

10. The illumination device according to claim 1, wherein a value, obtained by offsetting a result of acquiring the temperature at the first position based on a temperature at the first position in an initial state and a temperature at the second position in an initial state, is used when controlling the driving of the cooling part, instead of the acquired temperature at the first position.

11. The illumination device according to claim 6, wherein a light emission interval of the light emitting part is made longer in a case where the temperature at the first position exceeds the threshold, than in a case where the temperature at the first position does not exceed the threshold.

12. The illumination device according to claim 1, wherein the value of the light emission counter is calculated in consideration of a light emission amount and a light emission count of the light emitting part.

13. The illumination device according to claim 1, wherein the value of the light emission counter is calculated in consideration of a lapse of time after light emission of the light emitting part.

14. The illumination device according to claim 1, wherein the value of the light emission counter is calculated in consideration of a difference between the temperature at the first position and the temperature at the second position.

15. A control method for an illumination device including a light emitting part that emits light for illumination and a cooling part that cools the light emitting part, the control method comprising:
controlling driving of the cooling part based on a temperature at a first position of the light emitting part, a temperature at the second position that is less susceptible to a temperature change of the light emitting part than the first position, and presence or absence of light emission of the light emitting part,
wherein, counting by a light emission counter is started due to light emission of the light emitting part, and it is determined as the presence of light emission in a case where a value of the light emission counter exceeds a predetermined value, and it is determined as the absence of light emission in a case where the value of the light emission counter does not exceed the predetermined value.

\* \* \* \* \*